US008024444B2

(12) United States Patent  
Parikh et al.

(10) Patent No.: US 8,024,444 B2
(45) Date of Patent: Sep. 20, 2011

(54) ASSOCIATING TELEMETRY DATA FROM A GROUP OF ENTITIES

(75) Inventors: Ashish Parikh, Issaquah, WA (US); Rahul Arun Chabukswar, Bellevue, WA (US); Rohan S. Lam, Fall City, WA (US); Jonas Aich Richmeier, Marysville, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/403,846

(22) Filed: Mar. 13, 2009

(65) Prior Publication Data

US 2010/0235471 A1   Sep. 16, 2010

(51) Int. Cl.
G06F 15/16  (2006.01)
(52) U.S. Cl. .................................................. 709/223
(58) Field of Classification Search .................. 709/223, 709/224
See application file for complete search history.

(56) References Cited

U.S. PATENT DOCUMENTS

| | | | |
|---|---|---|---|
| 2005/0086340 A1* | 4/2005 | Kang et al. | 709/224 |
| 2006/0070117 A1* | 3/2006 | Spalink et al. | 726/3 |
| 2007/0282398 A1 | 12/2007 | Healy | |
| 2007/0287430 A1 | 12/2007 | Hosain | |
| 2007/0288247 A1 | 12/2007 | Mackay | |
| 2008/0082144 A1 | 4/2008 | Marcotte | |
| 2008/0154657 A1 | 6/2008 | Nayak | |
| 2008/0301783 A1 | 12/2008 | Abrutyn | |
| 2009/0007098 A1 | 1/2009 | Chevrette | |
| 2009/0007234 A1 | 1/2009 | Birger | |

OTHER PUBLICATIONS

Telemetry Networks, IRIG Standard 106-02 Part II, May 2001, pp. iii-C-2, Secretariat, Range Commanders Council, New Mexico. http://www.irig106.org/docs/106-05/irig106part2.pdf.
Weise, Designing an Adaptive Security Architecture, Sun Microsystems, Nov. 3, 2008, pp. 1-16. http://wikis.sun.com/download/attachments/57526796/820-6825.pdf.

* cited by examiner

*Primary Examiner* — David Lazaro
(74) *Attorney, Agent, or Firm* — Wolf, Greenfield & Sacks, P.C.

(57) ABSTRACT

Embodiments of the invention provide an ability to associate telemetry data received from different entities, such as guest and/or host machines residing on one or more particular physical computers (e.g., server computers) executing virtualization software. In some embodiments, telemetry data supplied by each entity includes information that identifies, and preserves the anonymity of, the entity (e.g., the computer(s) on which the guest and/or host machine(s) reside(s)). For example, if the entities comprise guest and/or host machines residing on a single computer, the information may comprise a one-way hash of the fully qualified domain name (FQDN) of the computer. If the entities are guest and/or host machines residing on a group of computers, the information may comprise a one-way hash of a portion of an FQDN for each computer which is common to all computers in the group. If the group of computers belong to a network domain having a globally unique identifier (GUID) (e.g., as employed by Microsoft Active Directory), the information may comprise a one-way hash of a portion of the GUID.

20 Claims, 5 Drawing Sheets

ASSOCIATING TELEMETRY DATA FROM A GROUP OF ENTITIES

FIELD OF INVENTION

This invention relates to the automated collection of information stored on computers deployed in a client-server environment.

BACKGROUND OF INVENTION

Many organizations operate one or more server computers to perform various computing tasks. Each server may communicate with one or more client computers over a network. For example, some server computers communicate with client computers within an organization over a local network, and some server computers communicate with client computers over the Internet. Generally, a server computer executes at least one operating system, and one or more server applications may execute under the control of each operating system. A server application may, for example, carry out tasks on behalf of, or provide services to, applications running on client computers. One common example of a server application is a web server application, which processes requests for information received from browser applications running on client computers and provides information to the browser application responsive to the requests.

In general, the services that a server is equipped to provide to a client computer are defined by modules or components of server applications installed on the server computer. Overall, these services may be thought of as "roles" which the server is capable of performing. A server may be equipped to perform a wide variety of roles. For example, depending on the application modules installed, a server may function as a file server, print server, mail server, web application server, terminal server, remote access and/or virtual private network (VPN) server, directory services server, streaming media server, or other server role. A server may perform any number of roles at a given time.

In accordance with some conventional techniques, information relating to how server application modules are installed and used on a server computer are collected. With some of these techniques, information (referred to herein as "telemetry information" or "telemetry data") is collected from the server computer and/or the applications thereon, stored on the server computer, and uploaded to an information collection facility (e.g., with the consent of the party that maintains the server computer). Once uploaded, telemetry information may be analyzed to enable, for example, server application providers to refine their applications to make them more useful and less error-prone over time. For example, if an application provider determines based on uploaded information that certain server roles are commonly implemented in combination, the provider may modify the application to allow the roles in question to be more easily combined, or develop new features for one role that complement features in another. In another example, a provider may help customers avoid problems associated with particular implementations. For example, if a provider determines that a particular role is commonly implemented in a server which is ill-configured to support its features (e.g., on a server with access to insufficient network bandwidth), then the provider may suggest that customers avoid this configuration.

Conventional telemetry data typically includes information that enables an information collection facility to associate telemetry data coming from the same originating entity over time. For example, a server computer may include a particular identifier within each set of telemetry data sent to an information collection facility, so that the information collection facility may use the identifier to determine that different sets of telemetry data received over time originated from the same server computer. This identifier is typically constructed to obfuscate the identity of the server computer, so as to preserve the anonymity of the party that maintains and operates it, and to preserve that party's privacy with respect to the implementation and use of server hardware and software.

Virtualization is a technique whereby a computer's resources may be partitioned into separate and isolated "virtual machines," each simulating a different machine within the same physical computer. Virtualization enables multiple instances of the same, or different, operating systems to run on the same physical computer and prevents applications running under the control of each operating system from interfering with each other's operation. In a system that employs virtualization, a virtual machine (also called a "guest machine") includes an instance of an operating system (a "guest operating system"), under the control of which one or more applications execute within the virtual machine. Each guest operating system may make requests to employ the computer's hardware to either a "host" operating system (e.g., if each guest machine on the computer runs the same operating system), or a "virtual machine monitor," or VMM (e.g., if the capability to run multiple operating systems is provided.) In some conventional systems, guest machines are configured to provide telemetry data to an information collection facility.

SUMMARY OF INVENTION

Applicants have appreciated that conventional systems are incapable of associating telemetry data received from different entities (e.g., different guest and/or host machines residing on a particular physical computer executing virtualization software, or different physical computers), and that an ability to associate telemetry data originating from different entities may provide valuable insight into how these entities are configured and operate.

For example, an ability to associate telemetry data received from different guest and/or host machines implemented on the same physical computer may provide the ability to compare the manner in which the different guest and/or host machines, or the applications executing under their respective control, are implemented and used. For example, the roles implemented by applications executing under the control of different guest operating systems on a particular server computer, or the speed with which system operations are performed by one or more guest operating systems and the host operating system on a physical computer, may be compared and analyzed. Other types of analysis that would enable application developers to refine their products over time may additionally be performed.

In accordance with some embodiments, telemetry data supplied by each entity includes information that identifies, and yet preserves the anonymity of, the entity and/or the party that operates it. For example, if the entity is a guest or host machine residing on a physical computer, the information may preserve the identity of the guest or host machine, the computer on which the guest or host machine resides, and the party that operates the computer. For example, in some embodiments, each guest and/or host machine residing on a physical computer stores the fully qualified domain name (FQDN) of the computer, generates a one-way hash of the FQDN (e.g., using the SHA-256 one way hashing algorithm), and incorporates the hash into telemetry data that is uploaded to an information collection facility. Using a one-way hashing algorithm may, for example, prevent an identification of the computer or its operator from the hash. The information collection facility, upon receiving the telemetry data, may compare hashes received from various guest and host machines. If the hashes provided by at least two guest and/or host machines match, the information collection facility may determine that the guest and/or host machines reside on the same physical server computer.

Embodiments of the invention are not limited to a virtualized environment, as some embodiments provide the ability to associate telemetry data from different computers in the same group (e.g., a network domain). For example, in some embodiments, telemetry data created by each computer in a group includes information that identifies the group, but does not compromise the anonymity of any computer, the group or the operator thereof. For example, in some embodiments, each computer may include within telemetry data a portion of an FQDN that is shared by each computer in the group, or, if the computers in the group employ Microsoft Active Directory, then the active directory GUID shared by all of the computers in the domain may be used. To preserve the anonymity of each computer and the group, a one-way hash of the information may, for example, be generated and included within telemetry data uploaded by each computer to an information collection facility. The information collection facility may use this information to determine that the computers reside in the same group.

DETAILED DESCRIPTION

Figure 1:
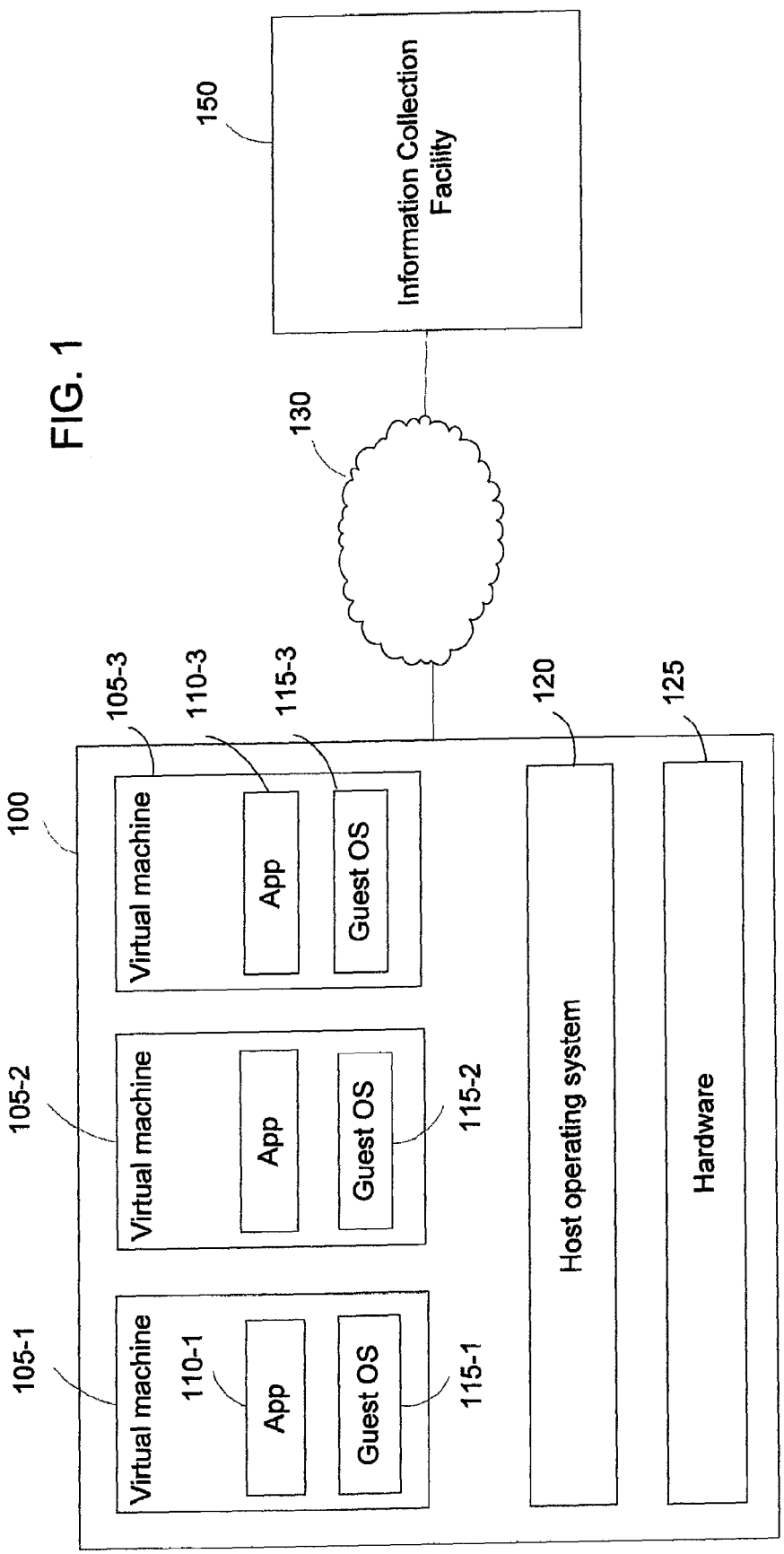
FIG. 1 is a block diagram depicting a system in which a computer having a plurality of virtual machines residing thereon communicates with an information collection facility.

In accordance with some embodiments of the invention, a capability is provided to associate telemetry data received from different entities, such as different guest and/or host machines residing on a particular physical computer (e.g., a server computer). For example, in some embodiments, telemetry data supplied to an information collection facility by each guest and/or host machine residing on a particular computer includes information that identifies, but preserves the anonymity of, the computer. Any suitable information may be used for this purpose, as embodiments of the invention are not limited to any particular implementation. In some embodiments, each guest and/or host machine on the computer stores the FQDN of the computer, generates a one-way hash of the FQDN (e.g., using the SHA-256 one-way hashing algorithm, and/or any other suitable algorithm), and incorporates the resulting hash to telemetry data that is uploaded to an information collection facility. The information collection facility may use the hashes to associate the guest and/or host machines with each other and/or the computer. Of course, embodiments of the invention are not limited to employing a computer's FQDN, as any information which may be used to associate guest and/or host machines may be used, including information which has no relationship to the computer. In addition, embodiments of the invention are not limited to employing a one-way hashing algorithm to generate the information included within the telemetry data, as any suitable technique may be employed to preserve the anonymity of the computer or its operator, if in fact anonymity is desired at all.

Embodiments of the invention are also not limited to associating telemetry data received from entities residing on a single computer, as some embodiments provide the ability to associate data received from different computers, such as computers that belong to the same group (e.g., a network domain). In some embodiments, each computer includes within telemetry data that is uploaded to an information collection facility information that identifies the group, but does not compromise its anonymity or that of the operator of any computer(s) in the group. For example, in some embodiments, each guest and/or host machine may store a portion of an identifier for computers in the group which is shared by all members of the group. For example, if a portion of the FQDN for each computer in the group is shared by all members, then that portion may be employed. Of course, embodiments of the invention are not limited to being implemented in this manner, as any suitable identifier(s) may be employed. For example, if all computers in the group reside in a network domain which employs Microsoft Active Directory, produced by Microsoft Corp. of Redmond, Wash., then the Active Directory Global Unique Identifier (GUID), which is unique to computers in the domain, may be employed. Any one or more identifiers may be employed, as the invention is not limited in this respect.

FIG. 1 depicts an example conventional system comprising a physical computer 100 on which guest machines 105-1, 105-2 and 105-3 reside. Computer 100 communicates with information collection facility 150 via network(s) 135, which may include any suitable communications infrastructure and employ any suitable protocol(s). Although FIG. 1 depicts only a single link between computer 100 and network 135, it should be appreciated that any suitable number of physical and/or virtual links (e.g., network adapters) may be employed (e.g., one for each guest machine), as the invention is not limited in this respect.

Each guest machine 105 includes a corresponding guest operating system 115, so that guest machine 105-1 includes operating system 115-1, guest machine 105-2 includes operating system 115-2, and guest machine 105-3 includes operating system 115-3. Each guest machine also includes an application 110 running under the control of its guest operating system, so that guest machine 105-1 includes application 110-1, guest machine 105-2 includes application 110-2 and guest machine 105-3 includes application 110-3. Although only one application 110 is shown as running under the control of a respective guest operating system, it should be appreciated that any number of applications may execute in a guest machine (including zero applications). Computer 100 also includes host operating system 120 which, in the example system shown, coordinates access by each of guest machines 115 to hardware 125 on the computer.

In the system of FIG. 1, host operating system 120 and each of guest machines 105 (e.g., guest operating systems 115 and applications 110) collect telemetry data regarding system operation. Some example techniques for collecting telemetry data are described in co-pending U.S. patent application Ser. No. 11/253,256, which is incorporated herein by reference. In general, each of the host operating system and guest machines may store telemetry data regarding the operation of the computer, the operating system, and/or the application(s) executing under its respective control. The data may be stored, for example, within the registry maintained by each of the host operating system and the guest machines, and/or in one or more other locations. One or more collection components may collect the stored information (e.g., on a periodic basis) and employ a transfer mechanism, such as the Software Quality Management (SQM) transfer mechanism offered by Microsoft Corp., or any other transfer mechanism, to transmit the information to information collection facility 150. As computer 100 is virtualized, each of host operating system 120 and guest operating systems 115-1, 115-2 and 115-3 provide telemetry data separately to information collection facility 150, and the telemetry data provided by each includes no information usable to identify other guest machines or the computer. As such, information collection facility 150 is unable to associate the telemetry data provided by any of the host operating system or guest machines with data provided from the others, or the computer.

Embodiments of the invention provide an ability to associate telemetry data provided by different guest and/or host machines residing on a physical computer by including within the data from each guest and/or host machine information which is usable to make this association. As noted above, the information may, for example, identify the computer on which each guest and/or host machine resides, in a manner which preserves the anonymity of the computer and its operator. As a result, telemetry data collected by guest and/or host machines may be more intelligently analyzed without compromising the privacy of the computer or operator.

Figure 2:
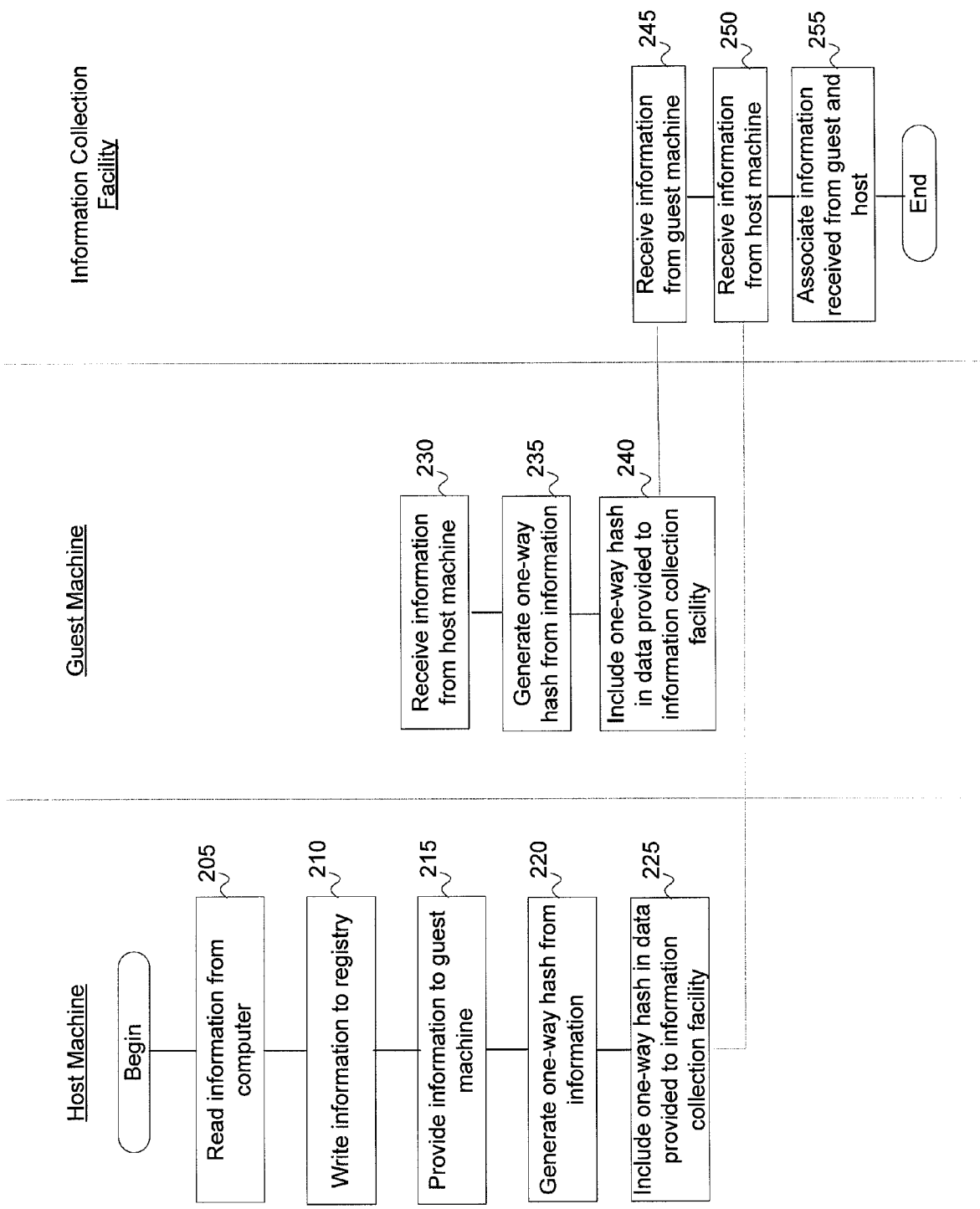
FIG. 2 is a flowchart depicting one example of a process whereby a guest and/or host machine may provide information to an information collection facility, in accordance with some embodiments of the invention.

FIG. 2 depicts an example process 200 whereby telemetry data that includes information usable to associate guest and/or host machines may be provided to an information collection facility. The example process shown in FIG. 2 depicts acts performed by a host machine (e.g., host operating system 120, FIG. 1), a guest machine (e.g., a guest operating system 115 in one of guest machines 105) and an information collection facility (e.g., facility 150). Although the example process of FIG. 2 includes acts performed by only one host machine and one guest machine, it should be appreciated that embodiments of the invention are not so limited, and that any suitable number of host and/or guest machines may perform the acts described below.

At the start of process 200, the host machine reads one or more items of uniquely identifiable information from the physical computer on which it resides in act 205. For example, the host machine may read the FQDN of the computer, from any storage location in which the FQDN is stored by the physical computer. In act 220, the host machine generates a one-way hash of the information read from the computer in act 205. This may be performed in any of numerous ways, such as by executing programmed instructions designed for this purpose. In some embodiments, a SHA-256 one-way hashing algorithm may be employed to generate a hash of the computer's FQDN. If employed, the SHA-256 algorithm generates a 256-bit hash value of the information which may be represented as an unsigned char array of length 32. This char array may be converted to a 64-wide char string, wherein each UCHAR in the array is represented as 2 hexadecimal characters.

It should be appreciated that generating a one-way hash of the information read in act 205 is but one example of a technique for producing a derivation of the information that may be useful in preserving the anonymity of the physical computer and/or its operator. Any suitable one or more techniques may alternatively be employed. If a one-way hashing algorithm is employed, the SHA-256 algorithm need not be used, as any of numerous other one-way hashing algorithms may be employed. Of course, if preserving the anonymity of the computer and/or its operator is unimportant, then no derivation need be produced in act 220. Embodiments of the invention may be implemented in any of numerous ways, and are not limited in this respect.

In act 225, the one-way hash (e.g., the 64-wide char string) generated in act 220 is included in telemetry data provided to the information collection facility. This may be performed in any of numerous ways. For example, the host machine and guest machine may each write the one-way hash to a data point in a data stream which includes various other telemetry data points provided to the information collection facility (e.g., on a periodic basis).

In act 230 the guest machine reads uniquely identifiable information from the physical computer. As with act 205, this may be performed in any of numerous ways. For example, when virtualization software is initiated on the physical computer and the guest machine is created, the information may be copied (e.g., by virtualization software) to the guest machine, and stored in any one or more locations accessible by the guest machine. As noted above, the information may comprise, as an example, the FQDN of the computer.

In act 235, the guest machine generates a one-way hash of the information. As discussed above with reference to act 220 a SHA-256 one-way hashing algorithm may be employed, although the invention is not limited to such an implementation, as any one or more algorithms may alternatively be used.

In act 240, the one-way hash generated in act 235 is included in telemetry data provided by the guest machine to the information collection facility. For example, the guest machine may write the one-way hash to a data point in a data stream that includes other telemetry data uploaded to the information collection facility.

In acts 245 and 250, respectively, the information collection facility receives the data (including the information included in acts 225 and 240) from the host machine and guest machine. In act 255, the information collection facility uses this information to associate the data received from the host machine and guest machine. This may be performed in any suitable fashion. Such as by comparing the information received from the host machine with the information received from the guest machine to determine that the host machine and guest machine reside on the same physical computer (e.g., computer 100, FIG. 1). Although the example process of FIG. 2 includes an information collection facility receiving data from only a single host machine and guest machine, information may be collected from any number of host and/or guest machines not represented in FIG. 2, as the invention is not limited in this respect.

Process 200 then completes.

It should be appreciated that not all embodiments of the invention include performing the acts described above in the specific sequence defined by example process 200. For example, some embodiments of the invention may include performing acts other than those described above, or may omit any one or more of the acts described above. For example, rather than the host machine providing information to the guest machine so that each may generate a one-way hash (or other derivation) of the information separately, the host machine could provide the hash to the guest machine. In addition, rather than the host machine reading the information from which a hash is generated (e.g., the FQDN) from the computer and providing it to one or more guest machines, each guest machine may instead read the information directly from the computer. Numerous variations of example process 200 may be employed, as embodiments of the invention may be implemented in any of numerous ways.

It should further be appreciated that although example process 200 comprises an information collection facility associating telemetry data provided by a single guest machine with that of a single host machine, embodiments of the invention may provide a capability to associate telemetry data received from any number of guest machines residing on a physical computer.

Telemetry data received by the information collection facility may be used in any of numerous ways. For example, telemetry data may be analyzed to better understand how server roles are implemented and used in virtualized environments; to better understand platform capabilities and hardware configurations of servers employing virtualization software; to better understand how virtualization software is used, configured, and performs; to identify trends in virtualization; and to compare information received from applications executing in virtualized and non-virtualized environments. Telemetry data received from guest and/or host machines in a virtualized environment may be analyzed in any of numerous ways.

In some embodiments, telemetry data received from each guest machine includes information descriptive of how the guest machine is implemented on the computer, which applications are installed and execute under the guest operating system (e.g., to implement different server roles), and how (e.g., the speed and efficiency with which) system operations are performed by the guest operating system and applications, so that this information may be compared with information received from other guest machines and a host machine. For example, information on how quickly certain system operations may be performed by the host machine and one or more guest machine may be compared to ascertain the efficiency with which a guest machine is able to access the computer's resources. As an example, if the information received from a certain guest machine indicates that a particular file copy operation performed by an application executing under its control takes a certain period of time, and information received from a host machine indicates that the same operation takes less time when performed by the host operating system, then this may indicate to developers of the virtualization software and/or the application that modifications may help the application access system resources more efficiently. It should be appreciated that the above is but one example that may be received and compared. Other examples of information that may be transmitted and analyzed by an information collection facility are described in above-referenced co-pending application Ser. No. 11/253,256.

As noted above, embodiments of the invention are not limited to associating telemetry data received from guest and/or host machines residing on a single computer, as some embodiments provide a capability to associate data received from guest and/or host machines residing on multiple computers (e.g., a group of servers operated by an organization). As a result, intelligence may be gleaned by comparing or correlating data received from various guest and/or host machines residing on a group of computers.

Figure 3:
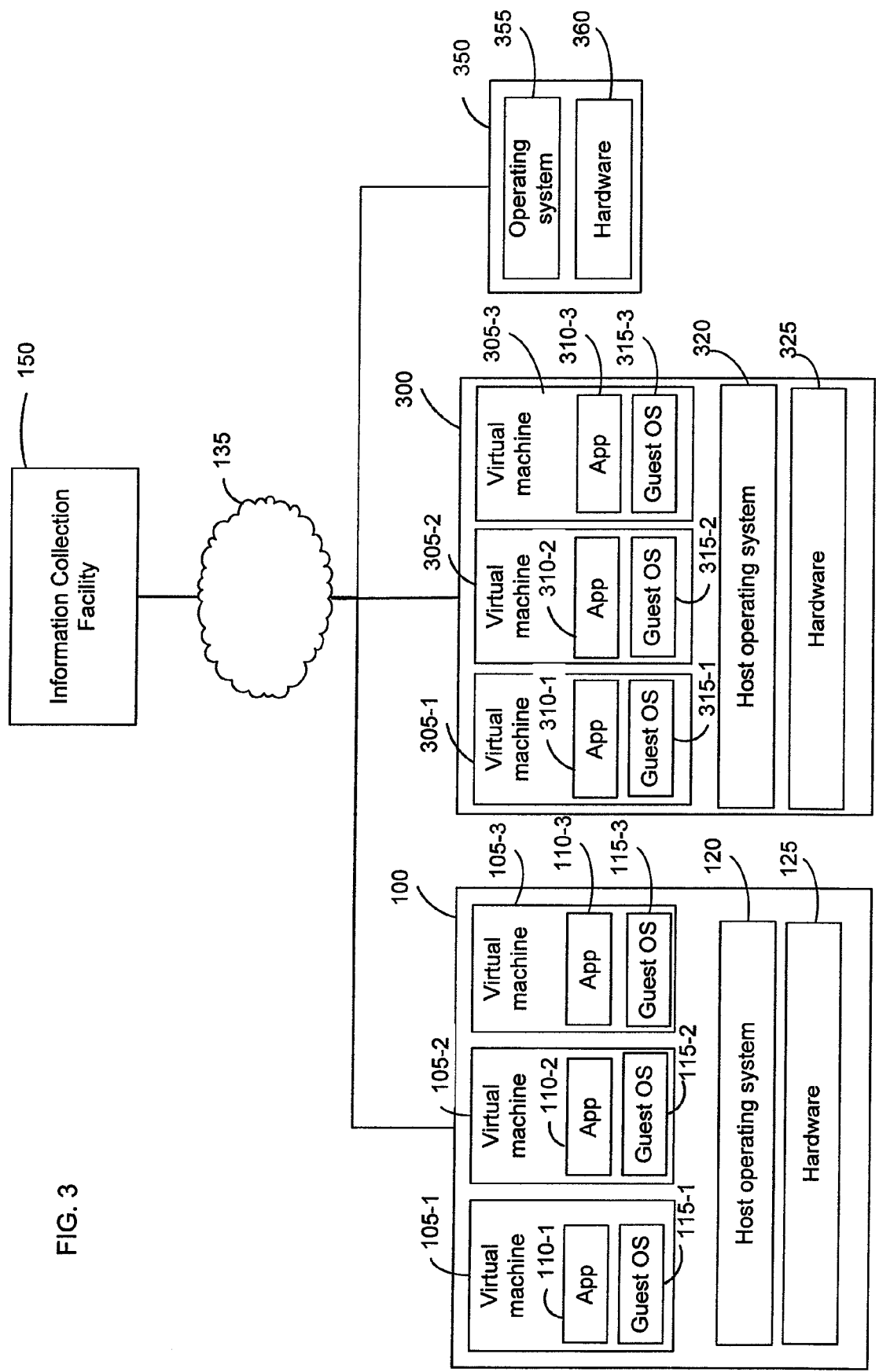
FIG. 3 is a block diagram depicting a system in which different entities may provide information to an information collection facility, in accordance with some embodiments of the invention.

FIG. 3 depicts an example system in which computer 100 (also depicted in FIG. 1) resides in a group of computers which also includes computers 300 and 350. Each of computers 100, 300 and 350 execute respective operating systems 120, 320 and 355, respectively. Computer 100 includes three guest machines 105-1, 105-2 and 105-3, and computer 300 includes guest machines 305-1 and 305-2, which include operating systems 315-1 and 315-2, respectively. Computer 350 does not execute virtualization software, and so computer 350 does not include any guest machine.

Computers 100, 300 and 350 each communicate with information collection facility 150 via network(s) 135, which may include any suitable communications infrastructure and employ any suitable protocol(s).

In some embodiments, the host and guest machines on each of computers 100 and 300 may perform a process similar to example process 200 (FIG. 2), wherein information shared by the host and guest machine is included in telemetry data provided by each to information collection facility 150, except that in the system of FIG. 3, the information is common to host and guest machines residing on these computers, so that the information included in telemetry data provided by guest machine 105-1 is the same as, for example, that which is included in telemetry data provided by guest machine 305-1.

This may be accomplished in any of numerous ways, such as by using an identifier or portion of an identifier which is shared by all computers in the group. For example, in some embodiments in which each computer in a group has an FQDN and a portion of the FQDN is common to all members of the group, then the shared portion may be employed. For example, if the FQDN for computer 100 is host1.microsoft.com and the FQDN for computer 300 is host2.microsoft.com, then the portion microsoft.com shared by both computers may be employed. Of course, an FQDN portion need not be used, as any suitable information may be employed. For example, in embodiments wherein the group of computers is a collection of servers in a network domain which employ Microsoft Active Directory, the active directory GUID for the domain may be used by each server.

As described above with reference to FIG. 2, a one-way hash and/or other derivation of this identifier may be generated (e.g., by each guest and/or host machine) and included in telemetry data transmitted to information collection facility 150. As a result, the information collection facility may associate data received from guest and/or host machines residing on each of the group of computers.

In addition, telemetry data provided by computer 350 to information collection facility 150 may include the information included in telemetry data by guest machines 105-1 and 305-1, so that the information collection facility may associate telemetry data received from each of these entities. For example, operating system 355 may include within telemetry data the same information as that which is included in telemetry data by guest machines 105-1 and 305-1. The information may, for example, be a one-way hash of information common to all members of the group of computers, such as a portion of the FQDN common to all members of the group, or the active directory GUID for the domain.

It should be appreciated that although only one computer that does not execute virtualization software (i.e., computer 350) is shown in FIG. 3, any number of computers not executing virtualization software may be included, and each may include within telemetry data provided to an information collection facility information that enables the information collection facility to associate the telemetry data provided by the computers.

Figure 4:
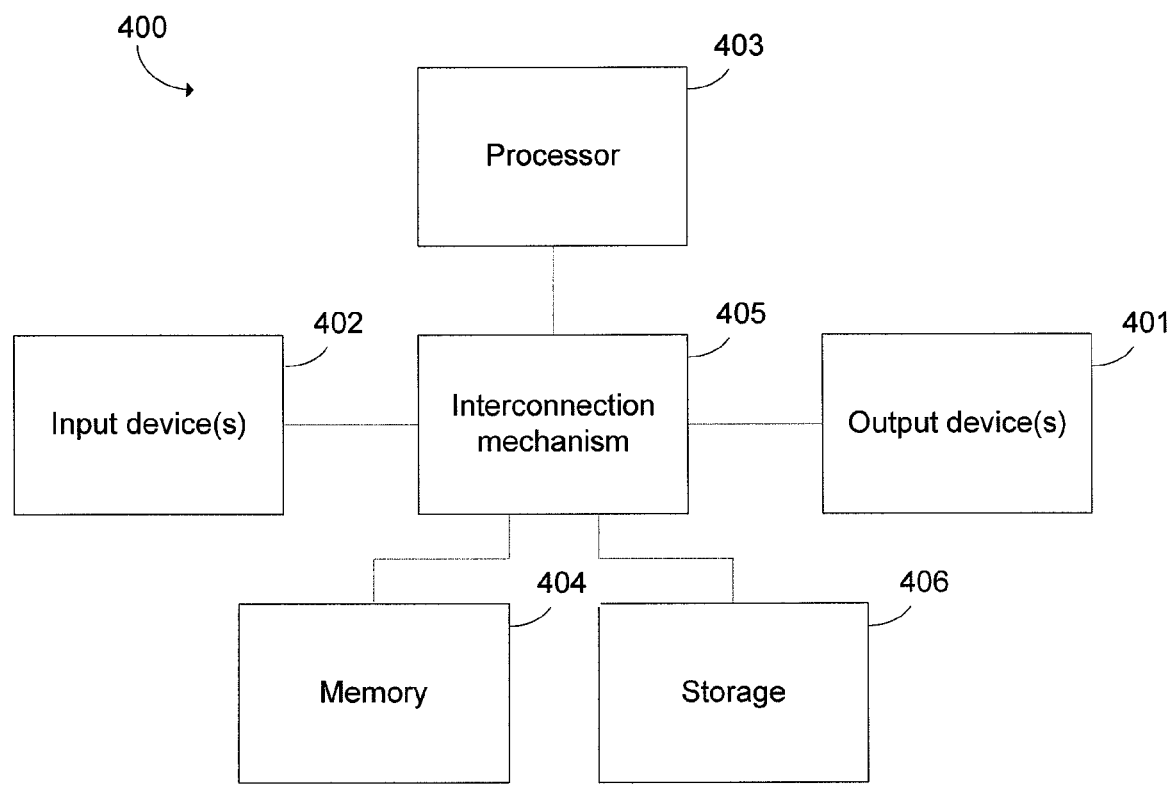
FIG. 4 is a block diagram depicting an example computer on which embodiments of the invention may be implemented.

Various aspects of the systems and methods for practicing features of the invention may be implemented on one or more computer systems, such as the exemplary computer system 400 shown in FIG. 4. Computer system 400 includes input device(s) 402, output device(s) 401, processor 403, memory system 404 and storage 406, all of which are coupled, directly or indirectly, via interconnection mechanism 405, which may comprise one or more buses, switches, networks and/or any other suitable interconnection. The input device(s) 402 receive(s) input from a user or machine (e.g., a human operator), and the output device(s) 401 display(s) or transmit(s) information to a user or machine (e.g., a liquid crystal display). The processor 403 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

The processor 403 may also execute one or more computer programs to implement various functions. These computer programs may be written in any type of computer program language, including a procedural programming language, object-oriented programming language, macro language, or a combination thereof. These computer programs may be stored in storage system 406. Storage system 406 may hold information on a volatile or non-volatile medium, and may be fixed or removable. Storage system 406 is shown in greater detail in FIG. 5.

Figure 5:
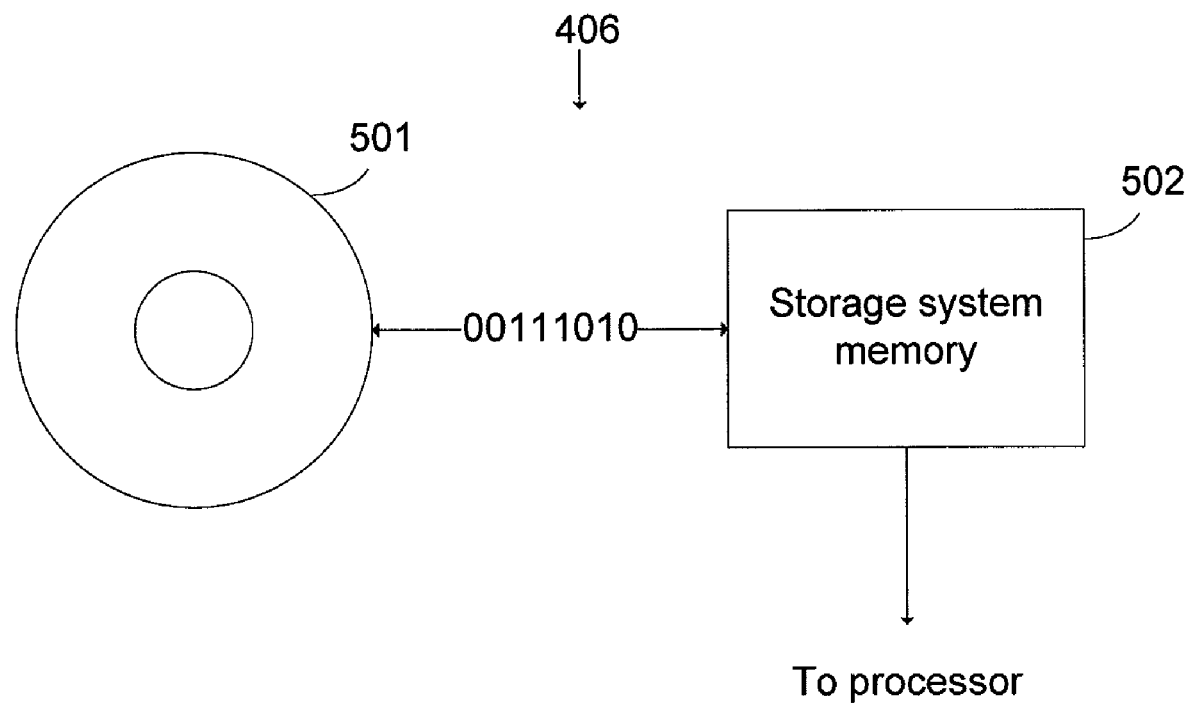
FIG. 5 is a block diagram depicting an example memory on which instructions may be encoded which, when executed, may implement embodiments of the invention.

Storage system 406 typically includes a computer-readable and writable nonvolatile recording medium 501, on which signals are stored that define a computer program or information to be used by the program. A medium may, for example, be a disk or flash memory. Typically, an operation, the processor 403 causes data to be read from the nonvolatile recording medium 501 into a volatile memory 502 (e.g., a random access memory, or RAM) that allows for faster access to the information by the processor 403 than does the medium 501. The memory 502 may be located in the storage system 406, as shown in FIG. 5, or in memory system 404, as shown in FIG. 4. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is also not limited to a particular memory system 404 or storage system 406.

Further, embodiments of the invention are also not limited to employing a cache manager component which is implemented as a driver in the I/O stack of an operating system. Any suitable component or combination of components, each of which may be implemented by an operating system or one or more standalone components, may alternatively or additionally be employed. The invention is not limited to any particular implementation.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. In this respect, it should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

Further, it should be appreciated that a (client or server) computer may be embodied in any of a number of forms, such as a rack-mounted computer, desktop computer, laptop computer, tablet computer, or other type of computer. Additionally, a (client or server) computer may be embedded in a device not generally regarded as a computer but with suitable processing capabilities, including a Personal Digital Assistant (PDA), smart phone or any other suitable portable or fixed electronic device.

Also, a (client or server) computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including a local area or a wide area network, such as an enterprise network and/or the Internet. Such networks may be based on any suitable technology and may operate according to any suitable protocol and may include wireless networks, wired networks or fiber optic networks. Also, the various methods or processes outlined herein may be coded as software that is executable on one or more processors that employ any one of a variety of operating systems or platforms.

Additionally, software may be written using any of a number of suitable programming languages and/or conventional programming or scripting tools, and also may be compiled as executable machine language code or intermediate code that is executed on a framework or virtual machine.

In this respect, the invention may be embodied as a computer-readable storage medium (or multiple storage media) (e.g., a computer memory, one or more floppy disks, compact disks, optical disks; magnetic tapes, flash memories, circuit configurations in Field Programmable Gate Arrays or other semiconductor devices, and/or other computer storage media) encoded with one or more programs which, when executed on one or more computers or other processors, perform methods that implement the various embodiments of the invention discussed above. The storage medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be provided in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. At least one tangible computer-readable storage medium article having instructions recorded thereon which, when executed, perform a method comprising:
   (A) receiving, by each of a plurality of guest and/or host machines implemented by at least one computer executing virtualization software, information descriptive of the at least one computer, the information received by each of the plurality of guest and/or host machines being the same information;
   (B) each of the plurality of guest and/or host machines generating a one-way hash of the information; and
   (C) each of the plurality of guest and/or host machines including the one-way hash of the information within its respective telemetry data generated for transmission to an information collection facility, to enable the information collection facility to form an association between the telemetry data generated by each of the plurality of guest and/or host machines.

2. The at least one tangible computer-readable storage medium article of claim 1, wherein the act (A) comprises one or more of the plurality of guest and/or host machines reading the information from the at least one computer.

3. The at least one tangible computer-readable storage medium article of claim 1, wherein the at least one computer comprises a server computer.

4. The at least one tangible computer-readable storage medium article of claim 3, wherein each guest machine executes at least one application implementing a server role for the server computer.

5. The at least one tangible computer-readable storage medium article of claim 3, wherein the information comprises a fully qualified domain name (FQDN) of the server computer.

6. The at least one tangible computer-readable storage medium article of claim 1, further comprising acts of:
   (D) transmitting the telemetry data for each of the plurality of guest and/or host machines to the information collection facility; and
   (E) the information collection facility forming the association between the telemetry data generated by each of the plurality of guest and/or host machines.

7. The at least one tangible computer-readable storage medium article of claim 1, wherein the act (B) comprises employing a SHA-256 one-way hashing algorithm.

8. A system comprising:
   at least one processor programmed to implement an information collection facility configured to:
      receive, from at least one computer coupled to the information collection facility via at least one network, each of the at least one computers executing virtualization software implementing a plurality of guest and/or host machines configured to generate respective telemetry data, information usable to form an association between the telemetry data generated by each of the plurality of guest and/or host machines; and
      form an association between the telemetry data received from each of the plurality of guest and/or host machines.

9. The system of claim 8, further comprising the at least one computer.

10. The system of claim 8, wherein the information usable to form an association between the telemetry data generated by each of the plurality of guest and/or host machines comprises a one-way hash of information included within the telemetry data by each of the plurality of guest and/or host machines, and the information collection facility is configured to form the association between the telemetry data received from each of the plurality of guest and/or host machines using the one-way hash.

11. The system of claim 10, wherein the at least one computer is a plurality of computers, each of the plurality of computers has an identifier of which at least a portion is common to each of the plurality of computers, and the information comprises the at least a portion of the identifier that is common to each of the plurality of computers.

12. The system of claim 11, wherein the at least a portion of the identifier comprises a portion of an FQDN of each of the plurality of computers that is common to each of the plurality of computers.

13. The system of claim 11, wherein the plurality of computers each belong to a same network domain, and the at least a portion of the identifier is a globally unique identifier (GUID) for the domain.

14. The system of claim 8, wherein the at least one computer is a single computer, and wherein the information collection facility is configured to form an association between telemetry data received from guest and/or host machines implemented on the single computer.

15. The system of claim 8, wherein the at least one computer is a plurality of computers, and wherein the information collection facility is configured to form an association between telemetry data received from guest and/or host machines implemented on each of the plurality of computers.

16. A method for use in a system comprising a plurality of computers each coupled to an information collection facility via at least one network, the method comprising:
   (A) each of the plurality of computers generating respective telemetry data for transmission to the information collection facility, the telemetry data generated by each of the plurality of computers comprising a same item of information which can not be used to identify any of the plurality of computers but which can be used to form an association between the telemetry data generated by each of the plurality of computers; and
   (B) transmitting the telemetry data generated by the plurality of computers to the information collection facility via the at least one network.

17. The method of claim 16, wherein at least one of the plurality of computers executes virtualization software.

18. The method of claim 16, further comprising an act of:
   (C) the information collection facility receiving the telemetry data generated by the plurality of computers; and
   (D) the information collection facility using the item of information to form an association between the telemetry data generated by the plurality of computers.

19. The method of claim 16, wherein at least one of the plurality of computers is a server computer.

20. The method of claim 16, wherein the item of information generated by each one of the plurality of computers comprises a one-way hash of information descriptive of the one computer.

* * * * *

UNITED STATES PATENT AND TRADEMARK OFFICE
CERTIFICATE OF CORRECTION

PATENT NO. : 8,024,444 B2  
APPLICATION NO. : 12/403846  
DATED : September 20, 2011  
INVENTOR(S) : Ashish Parikh et al.

Page 1 of 1

It is certified that error appears in the above-identified patent and that said Letters Patent is hereby corrected as shown below:

In column 11, line 55, in Claim 1, after "within" delete "its".

Signed and Sealed this  
Twenty-second Day of November, 2011

David J. Kappos  
*Director of the United States Patent and Trademark Office*